(No Model.)

J. P. ROWAN.
FENDER.

No. 503,331. Patented Aug. 15, 1893.

Witnesses

Inventor
Joseph P. Rowan
by John Wedderburn
his Attorney

UNITED STATES PATENT OFFICE.

JOSEPH P. ROWAN, OF LOS ANGELES, CALIFORNIA.

FENDER.

SPECIFICATION forming part of Letters Patent No. 503,331, dated August 15, 1893.

Application filed October 29, 1892. Serial No. 450,370. (No model.)

*To all whom it may concern:*

Be it known that I, JOSEPH P. ROWAN, of Los Angeles, in the county of Los Angeles and State of California, have invented certain new and useful Improvements in Fenders; and I do hereby declare the following to be a full, clear, and exact description of the invention, such as will enable others skilled in the art to which it appertains to make and use the same.

This invention relates to certain new and useful improvements in pilots or fenders for railway-cars, adapted for cars propelled by steam, electric-power, horses or cable, designed for its simplicity, durability, and efficiency; and its further object is to provide a fender which shall yield when coming in contact with a person or obstruction, and novel means for raising or lowering the fender when desired.

My invention further consists in the novel construction, combination and arrangement of parts hereinafter specified and set forth, in the claims.

Figure 1:
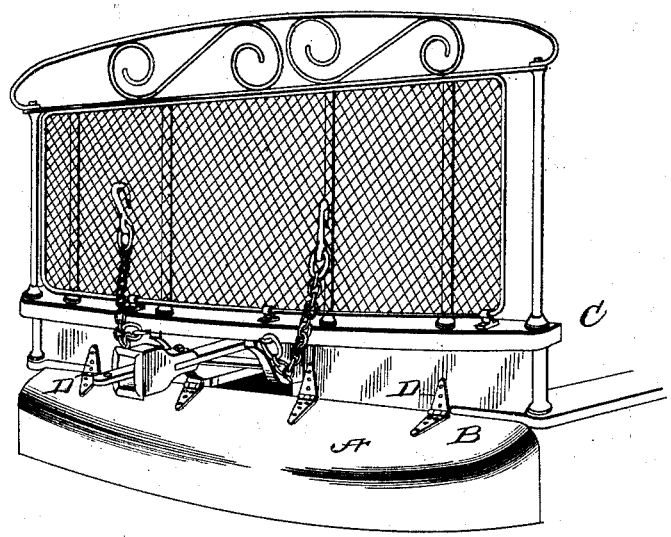
Figure 2:
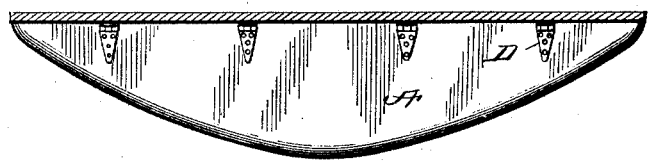
Figure 3:
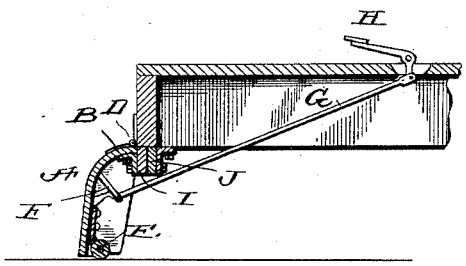

In the accompanying drawings, Figure 1 is a side elevation of my improved fender attached to a car or dummy, and Fig. 2 is a plan view of the same. Fig. 3 is a vertical section of the fender and a portion of the dummy.

A is the main part of the fender made of metal or wood, convex in form, the lower curved portion being adapted to lie just above the road bed. The upper straight portion B of the fender is hinged to the front of the car or dummy C by means of the hinges D. To prevent the main part of the fender from being pressed against the road bed and tracks I have supplied rubber rollers E. Extending upward and inward from the upper part of the fender is a rod or arm F, to the upper end of which is pivoted the link G, which is in turn pivoted at its other end to a foot lever H, which is adapted to be operated by the gripman.

In order to allow the fender to have sufficent play in case a heavy body strikes the curved portion of the same I have constructed the lazy backs I and J which are two stout boards, the former being secured to the forward portion of the dummy by angle irons and the latter being secured to the under surface of the fender in such a manner that the two boards lie face to face and when a heavy body falls on the fender the boards I and J spring sufficiently to allow the fender to be pressed down in close contact with the tracks.

The object of having the fender constructed as I have described above, is to adapt it to carry on its central upper surface, a person struck, if the person is struck squarely and is not pushed to the side of the rail, instead of rolling and mangling said person, as is the case with the form of fender now in use.

The principal object of the lever that I have described, is to avoid any possibility of the failure of the fender when struck by an object to remain close to the road bed by its gravity, and in such a case the gripman has full control of the fender and can immediately force it down against the road bed.

This device is especially adapted to be applied to the forward end of the dummies of cable rail-way cars and the utility and efficiency of the same is obvious, for should a person be struck and knocked down by the dummy, his weight will press the fender against the track and he will be thrown on to the central upper surface of the convex fender and carried along and thereby avoid being seriously injured.

The construction and arrangements of the several parts of my improved fender being thus made known, the operation and the advantages of the same will, it is thought be readily understood.

Having thus fully described my invention, what I claim, and desire to secure by Letters Patent, is—

1. In a car fender, the convex fender A, rollers E lazy backs I and J and means for raising or lowering the fender, substantially as and for the purpose set forth.

2. In a car fender, the convex fender A hinged at its upper end to a car and having at its lower end rollers E, in combination with arm F, link G, and foot lever H, substantially as and for the purpose set forth.

In testimony whereof I have signed this specification in the presence of two subscribing witnesses.

JOSEPH P. ROWAN.

Witnesses:
CALEB MILLIGAN,
I. H. POLK.